(12) United States Patent
Fent et al.

(10) Patent No.: US 11,708,076 B2
(45) Date of Patent: Jul. 25, 2023

(54) METHOD FOR IDENTIFYING A CAUSE OF BLOCKAGE IN A SEQUENCE OF IMAGES, A COMPUTER PROGRAM FOR PERFORMING SAID METHOD, A COMPUTER-READABLE RECORDING MEDIUM CONTAINING SUCH COMPUTER PROGRAM, A DRIVING ASSISTANCE SYSTEM CAPABLE OF EXECUTING SAID METHOD

(71) Applicant: TOYOTA MOTOR EUROPE, Brussels (BE)

(72) Inventors: Guillaume Fent, Brussels (BE); Christophe Gillet, Brussels (BE); Hideaki Hayashi, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 0 days.

(21) Appl. No.: 16/314,994

(22) PCT Filed: Jul. 7, 2017

(86) PCT No.: PCT/EP2017/067157
§ 371 (c)(1),
(2) Date: Jan. 3, 2019

(87) PCT Pub. No.: WO2019/007536
PCT Pub. Date: Jan. 10, 2019

(65) Prior Publication Data
US 2021/0370938 A1    Dec. 2, 2021

(51) Int. Cl.
*B60R 16/037*    (2006.01)
*B60R 25/20*    (2013.01)
(Continued)

(52) U.S. Cl.
CPC ............... *B60W 30/18* (2013.01); *B60Q 1/08* (2013.01); *B60R 11/04* (2013.01); *G06V 20/58* (2022.01); *G06V 20/588* (2022.01)

(58) Field of Classification Search
None
See application file for complete search history.

(56) References Cited

U.S. PATENT DOCUMENTS

| 8,045,760 B2 * | 10/2011 | Stam | G06K 9/00798 |
| | | | 382/104 |
| 2009/0180682 A1 * | 7/2009 | Camus | H04N 13/239 |
| | | | 382/154 |

(Continued)

FOREIGN PATENT DOCUMENTS

| EP | 3 103 695 A2 | 12/2016 |
| WO | 2004/076231 A2 | 9/2004 |

OTHER PUBLICATIONS

Communication dated Apr. 21, 2020 from Japanese Patent Office in JP Application No. 2019-500266.

(Continued)

*Primary Examiner* — Adam D Tissot
*Assistant Examiner* — Laura E Linhardt
(74) *Attorney, Agent, or Firm* — Sughrue Mion, PLLC (57) ABSTRACT

A method for identifying a cause of blockage in a sequence of images provided by a camera of a vehicle, the method comprising iteratively:
S10) acquiring an image of the camera; successively acquired images forming a sequence of images;
S20) detecting a blockage in last images of the sequence of images;
S60) determining whether it is day-time or night-time based on time information;
if it is determined that it is night-time:

(Continued)

S82) determining whether toggling front light(s) of the vehicle on/off causes a change in images acquired by the camera; and S84) in this case, determining that for the current iteration, the cause of the blockage is presumably the road being dark.

A computer program for performing said method, a computer-readable recording medium containing such computer program, a driving assistance system capable of executing said method.

19 Claims, 3 Drawing Sheets

(51) Int. Cl.
| | |
|---|---|
| *G07C 5/00* | (2006.01) |
| *B60H 1/00* | (2006.01) |
| *B60S 1/02* | (2006.01) |
| *B60W 30/18* | (2012.01) |
| *B60Q 1/08* | (2006.01) |
| *B60R 11/04* | (2006.01) |
| *G06V 20/58* | (2022.01) |
| *G06V 20/56* | (2022.01) |

(56) References Cited

U.S. PATENT DOCUMENTS

| | | |
|---|---|---|
| 2011/0280026 A1 | 11/2011 | Higgins-Luthman |
| 2014/0070698 A1 | 3/2014 | Pierce et al. |
| 2017/0106721 A1* | 4/2017 | Hoke ............... B60S 1/023 |
| 2018/0148008 A1* | 5/2018 | Gage ............... G07C 5/008 |

OTHER PUBLICATIONS

International Search Report for PCT/EP2017/067157 dated Mar. 28, 2018 (PCT/ISA/210).

Office Action dated Jan. 13, 2023 from the China National Intellectual Property Administration in CN Application No. 201780043018.1.

\* cited by examiner

METHOD FOR IDENTIFYING A CAUSE OF BLOCKAGE IN A SEQUENCE OF IMAGES, A COMPUTER PROGRAM FOR PERFORMING SAID METHOD, A COMPUTER-READABLE RECORDING MEDIUM CONTAINING SUCH COMPUTER PROGRAM, A DRIVING ASSISTANCE SYSTEM CAPABLE OF EXECUTING SAID METHOD

CROSS REFERENCE TO RELATED APPLICATIONS

This application is a National Stage of International Application No. PCT/EP2017/067157 filed Jul. 7, 2017.

TECHNICAL FIELD

The present invention is directed to a method for identifying a cause of blockage in a sequence of images provided by a camera mounted in a vehicle which is moving on a road.

BACKGROUND ART

Cameras have now become an indispensable equipment on most cars where they provide highly valuable information, in particular in automated driving systems, for instance in advanced driver assistance systems (ADAS).

Although they are usually highly reliable, in different circumstances cameras can experience problems which lead to a situation known as blockage situation, where a field of view of the camera appears to be blocked.

In such a blockage situation, a part or possibly the whole image does not change or only very slightly changes over successive image acquisitions by the camera.

While this situation can be normal, for instance if the scene viewed by the camera does not change, conversely such blockage situation can also be caused by a failure of the camera or by a problem related to the camera such as icing or fogging of the windscreen behind which the camera is placed.

For this reason, at least for cameras mounted aboard vehicles, it is usually necessary to detect blockage situations of the camera(s) and to react appropriately to this situation.

The problem of camera blockage has already been identified and methods have been developed in order to automatically detect a blocked field of view in a camera. Such a method is for instance disclosed by document US 2010/0182450.

However, detecting that a camera has a blocked field of view is not sufficient to determine how to react to this situation. It does not explain why the field of view is blocked, and does not either help to fix the problem so that the camera works again. Accordingly, there is a need for a method providing the cause of a blockage of a camera, and thus making it possible to take action to get the camera to function normally again.

The invention has been constructed in view of the above problems of the prior art, and a first object of the invention is therefore to propose a method for identifying the cause of a blockage of a camera.

DISCLOSURE OF THE INVENTION

According to the present invention, it is proposed a method for identifying a cause of blockage in a sequence of images provided by a camera mounted in a vehicle which is moving on a road, the method comprising iteratively performing steps of:

S10) acquiring an image of the camera; successively acquired images thus forming said sequence of images;

S20) detecting a blockage in last images of the sequence of images;

S60) determining whether it is day-time or night-time based at least on time information;

if it is determined that it is night-time, performing a step S80 comprising:

S82) determining whether toggling front light(s) of the vehicle on/off causes a change in images acquired by the camera; and S84) if it is determined that toggling front light(s) on/off causes a change in said images acquired by the camera, determining that for the current iteration, the cause of the blockage is presumably the road being dark.

Advantageously, the simple determination of step S82 makes it possible to determine that the cause of the blockage is presumably the road being dark. This situation of a 'dark road' is simply a situation where the vehicle moves on a road which does not bear any marking, and is uniformly dark. Such situation can happen for instance just after a road has been renewed, before the lane markings have been applied.

Advantageously, this method uses information provided by several sensors of the car, as well as (in some embodiments) information normally needed for the guidance of the car, such as a database comprising records of lanes having lane markings, to identify the cause of the blockage of the camera.

The method can further be adapted to also identify causes of blockages happening during day trips.

Accordingly, in an embodiment the method further comprises, if, during an iteration, it is determined at step S60 that it is day-time, performing a step S70 comprising:

S72) determining whether outside temperature is below a low temperature threshold; and S73) if it is determined that the outside temperature is below the low temperature threshold, determining that for a current iteration, the cause of the blockage is presumably icing or fogging.

Thanks to this method, simply by determining that it is day-time (step S60) and by determining that the outside temperature is below a low temperature threshold (step S73), it is possible to determine that the cause of the blockage is presumably icing or fogging.

An icing situation is a situation in which ice is formed on one of the walls which separate the sensing surface of the camera from the scene it films (these walls are the walls of the windscreen or of the lens(es) of the camera), which ice causes the image to be blocked. Usually the ice would be formed on the windscreen itself.

A fogging situation is similar, except that instead of ice, fog is formed on the wall(s) separating the sensing surface of the camera from the scene.

The method is based on an algorithm which is executed iteratively on a computer. The word 'computer' here must be construed broadly as any computing platform, including one or more electronic control unit(s), graphic processing unit(s) (GPUs), regular computer(s), which can be located or not aboard the vehicle.

The method advantageously can be run in real time, but it is not necessary. If the method is not run in real time, of course the time to consider at step S60 is the time at which the last image of the sequence of images was acquired.

In a variant of the above embodiment, the method further comprises at step S70, if it has been determined at step S72 that the outside temperature is below the low temperature threshold, performing the steps of:

S74) determining whether dew point is reached;

if it is determined that the dew point is not reached, determining that for the current iteration, the cause of the blockage is presumably icing or fogging with a first probability;

S75) if it is determined that the dew point is reached, determining that for the current iteration, the cause of the blockage is presumably icing or fogging with a second probability which is higher than the first probability.

Consequently, simply by checking that the dew point is reached at step S74, it is possible to assess more precisely the probability for the cause of the blockage to be icing or fogging:

if the dew point is not reached, the probability for the cause of the blockage to be icing or fogging is then set to the first probability;

If the dew point is reached, the probability for the cause of the blockage to be icing or fogging is set to the second probability, which is higher than the first probability.

In a variant of the embodiment of the method comprising a step S70, step S70 further comprises the step S78 of, if it is determined that the outside temperature is above the low temperature threshold or, in case it is checked whether the dew point is reached, the dew point is not reached, determining that for the current iteration, the cause of the blockage is presumably a sunset/sunrise situation or a uniform landscape situation.

Advantageously, the simple determination of step S78 makes it possible to determine a second cause of blockage, that is, to determine that the cause of the blockage is presumably either a sunset/sunrise situation, or a uniform landscape situation.

A sunset/sunrise situation is a situation in which the camera, which has probably been oriented towards the sun, is subject to blooming, whereby the acquired images present a blockage during this situation.

A 'uniform landscape' situation is a situation in which the landscape is uniform, and more precisely uniform to the point that a situation of blockage is detected in the sequence of images successively acquired.

The method is an iterative method. At each iteration, the algorithm can identify a presumed cause of the blockage.

In some embodiments, improvements can be included in order to make sure that the method correctly identifies the cause(s) of the blockages of the camera, and consequently to increase the reliability of the method.

For instance, in an embodiment, the method further comprises, during an iteration, before performing step S60, performing steps of:

S40) detecting lane markings in a last image of the sequence of images; and

S45) if lane markings are detected in the last image, returning to step S10 of image acquisition.

In this embodiment, in steps S40 and S45, it is checked whether lane markings can be identified in the image and, in the iteration under consideration, the determination of a cause of the blockage at steps S60 and S70 is not performed if lane markings are detected in the last image (the last image acquired at step S10).

Indeed, if the camera is able to detect lane markings, it is presumed that the camera is not really blocked. Therefore if the lane markings are detected, performing steps 60 and 70 of the method would most probably lead to an erroneous conclusion of a blockage of the camera.

In addition, this embodiment of the method can be improved as follows.

In a variant, the method for identifying the cause of the blockage further comprises, during an iteration, before performing step S40, performing steps of:

S30) determining whether a lane on which the vehicle moves has lane markings, based on position information of the vehicle and a database comprising records of lanes having lane markings; and S35) if a lane on which the vehicle moves does not have lane markings, returning to step S10 of image acquisition.

Indeed, steps S30 and S35 can advantageously lead to interrupt the current iteration and to start a new iteration (at step 10) by performing the simple test that the lane has markings at step 30. These steps S30 and S35 in particular make it possible to avoid detecting lane markings in the last image, which consumes far more computing power than checking whether the road lane has road markings.

Another improvement to increase the reliability of the method uses the environment sensors of the vehicle, that is, the sensors which are capable of detecting objects around the vehicle (for example the radars, the lidar(s), . . . ).

In particular, in an embodiment, the method further comprises, during an iteration, before performing step S60, performing steps of:

S50) detecting whether there is an object on the road in front of the vehicle, based on information other than information derived from the images; S55) if no object is detected on the road in front of the vehicle, returning to step S10 of image acquisition.

In that case, in the iteration under consideration, the blockage cause identification steps S60 and 70 are only performed if it is detected that there is an object on the road in front of the vehicle but, despite the presence of this object, a blockage situation in the sequence of images has been detected.

Conversely, if no object is detected, the situation of blockage of the camera is not considered as being sufficiently confirmed; the iteration is aborted and the method is resumed at step S10.

The method presented so far only provides presumed causes of blockage of the camera.

In order to have a more reliable determination of the cause of blockage of the camera, it can be preferable to require that the method consistently indicates the same cause over several iterations to conclude that this cause is indeed the cause of the blockage of the camera.

Accordingly, in an embodiment the method further comprises, when during an iteration, a first cause of blockage has been detected, performing the steps of:

S90) assessing whether a blockage has been detected at least for each of last N1 iterations, and assessing whether the cause of the blockage has been determined to be presumably said first cause for at least N2 iterations during the last N1 iterations, N1 and N2 being predetermined numbers, and, if a blockage has been detected at least for each of last N1 iterations, and the cause of the blockage has been determined to be presumably said first cause for at least N2 iterations during the last N1 iterations, triggering an action based on the determination that the cause of the blockage is said first cause.

This action can be for instance switching ON or OFF the air-conditioning or the air heater, etc.

The number of iterations required in step S90 to reach the conclusion that the camera blockage is of a certain type may depend on the type of blockage. For instance, a higher number of determinations might be required to conclude that a blockage is of type icing or fogging rather than to conclude that a blockage is of sunrise/sunset or uniform landscape.

The proposed method can be applied either to whole images of the camera, or only to portions of images of the camera.

For instance, in an embodiment of the method, the images are partial images which are part of larger images acquired by the camera.

In order to execute the method according to the invention, the method preferably includes periodically the steps of:

S10) acquiring outside temperature;
S12) acquiring time, and possibly the date;
S14) acquiring current position information of the vehicle using a geographical positioning system.

As an alternative, these values can be considered as being constant during the whole trip or at least a considered period.

The geographical positioning system mentioned above, hereinafter called the 'GPS', may be any system which provides, or outputs, the geographical position of the vehicle.

The GPS can be a usual satellite-based GPS, but can be any system providing the same information. For example, the geographical position of a vehicle can be determined (or at least updated, if an initial position is known) based on a high-definition map by analyzing the images acquired by the camera and/or point clouds acquired by a lidar.

In addition, the method preferably includes a step of controlling, periodically or even at each iteration, that the vehicle is moving (The test can be done by comparing the speed of the vehicle to a minimum speed, for instance 10 km/h).

The result of the method according to the present invention is an information which can help to determine how to react to the blockage of the camera. Therefore usually, once the cause of the blockage has been identified (at least presumed), or preferably confirmed at step S90, the cause of the blockage is normally transmitted to a vehicle control system and/or to the driver of the vehicle.

Based on this information, it can be decided for instance to turn on or off a heating or an air-conditioning system of the vehicle based on the cause of the blockage of the camera.

In particular, if the cause of the blockage is determined to be icing or fogging, the driver (or a control system of the vehicle) can decide to activate a heater in order to heat the camera housing, a defogger in order to remove fog from a lens of the camera or of the windscreen, etc. depending on the particulars of the situation.

In a particular implementation, the various steps of the method for identifying a cause of blockage in a sequence of images are determined by computer program instructions.

Accordingly, the invention also provides a computer program which is stored on a computer readable storage media, and which is suitable for being performed in a computer, the program including instructions adapted to perform the steps of the method described above when it is run on the computer.

The computer program may use any programming language, and be in the form of source code, object code, or code intermediate between source code and object code, such as in a partially compiled form, or in any other desirable form.

The invention also provides a computer-readable recording medium including instructions of a computer program as mentioned above.

The recording medium may be an entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Alternatively, the recording medium may be an integrated circuit in which the program is incorporated, the circuit being adapted to execute or to be used in the execution of the method in question.

Another object of the present invention is to provide a driving assistance system for a road vehicle, the driving assistance system comprising a camera and being capable of determining a cause or at least a presumed cause of a blockage in a sequence of images provided by the camera.

Here, a driving assistance system is defined as any system which provides information and/or controls which is or are useful for driving a vehicle. In the present case, the driving assistance system is mounted or is to be mounted in a road vehicle such as a car, a truck, etc.

In order to perform its function, a driving assistance system normally comprises at least one sensor, an electronic control unit, and one or more feedback device(s) which transmit(s) information to the driver, and/or act(s) on control member(s) of the vehicle (for instance the steering shaft, the brake, the accelerator pedal or the like) instead of the driver, in order to take part or all of the driving load off the driver, at least during some driving periods.

A driving assistance system can be for instance an automated driving system of level 1 or more as defined by SAE norm J3016. Such an automated driving system is a motor vehicle driving automation system that is capable of performing part or all of the dynamic driving task (DDT) on a sustained basis.

The above-mentioned object of the present invention is met by a driving assistance system, comprising an electronic control unit, a camera, an outer temperature sensor; wherein the electronic control unit, the camera and the outer temperature sensor are configured to be mounted in a vehicle, and wherein the electronic control unit is configured to iteratively:

S10) acquire an image of the camera; successively acquired images thus forming said sequence of images; S20) detect a blockage situation in last images of the sequence of images;

S60) determine whether it is day-time or night-time based at least on time information; and if, during an iteration, the electronic control unit determines that it is night-time:

S82) determine whether toggling front light(s) of the vehicle on/off causes contrast change in the images; and S84) if the electronic control unit has determined that toggling front light(s) on/off causes contrast change in the images, determine that for the current iteration, the cause of the blockage is presumably the road being dark.

In an embodiment of the driving assistance system, the electronic control unit is further configured, if, during an iteration, the electronic control unit has determined that it is day-time:

S72) to determine whether outside temperature is below a low temperature threshold, based on information provided by the outer temperature sensor; and S73) if the electronic control unit has determined that the outside temperature is below a low temperature threshold, to determine that for a current iteration, the cause of the blockage is presumably icing or fogging.

In a variant of the above embodiment, the driving assistance system further comprises a humidity sensor, and the electronic control unit is further configured (at step S70):

S74) to determine whether dew point is reached;

if the electronic control unit has determined that the outside temperature is below the low temperature threshold and that the dew point is not reached, to determine that for the current iteration, the cause of the blockage is presumably icing or fogging with a first probability; and S75) if the electronic control unit has determined that the outside temperature is below the low temperature threshold and that the dew point is reached, to determine that for the current iteration, the cause of the blockage is presumably icing or fogging with a second probability which is higher than the first probability.

In a variant of the above embodiment of the driving assistance system comprising features S72 and S73, the electronic control unit is further configured:

S78) if the electronic control unit has determined that the outside temperature is above a low temperature threshold or dew point is not reached, to determine that for a current iteration, the cause of the blockage is presumably a sunset/sunrise situation or a uniform landscape situation.

In an embodiment of the driving assistance system, the electronic control unit is further configured, during an iteration, before determining whether it is day-time or night-time:

S40) to detect lane markings in a last image of the sequence of images; and

S45) if at least one lane marking is detected in the last image, to return to step S10 of image acquisition.

In an embodiment of the driving assistance system, the electronic control unit is further configured, during an iteration, before determining whether it is day-time or night-time:

S50) to detect whether there is an object on the road in front of the vehicle, using environment information other than information derived from the images; and S55) if the electronic control unit has detected that there is an object on the road in front of the vehicle, to return to step S10 of image acquisition.

In an embodiment of the automated driving system, the electronic control unit is further configured, when, during an iteration, a first cause of blockage has been detected:

S90) to assess whether a blockage has been detected at least for each of last N1 iterations, and to assess whether the cause of the blockage has been determined to be presumably said first cause for at least N2 iterations during the last N1 iterations, N1 and N2 being predetermined numbers, and, if a blockage has been detected at least for each of last N1 iterations, and the cause of the blockage has been determined to be presumably the first cause for at least N2 iterations during the last N1 iterations, to trigger an action based on the determination that the cause of the blockage is said first cause.

BRIEF DESCRIPTION OF THE DRAWINGS

The present invention may be better understood and its numerous other objects and advantages will become apparent to those skilled in the art by reference to the accompanying drawing wherein like reference numerals refer to like elements in the several figures and in which.

DESCRIPTION OF THE PREFERRED EMBODIMENT

Figure 2:
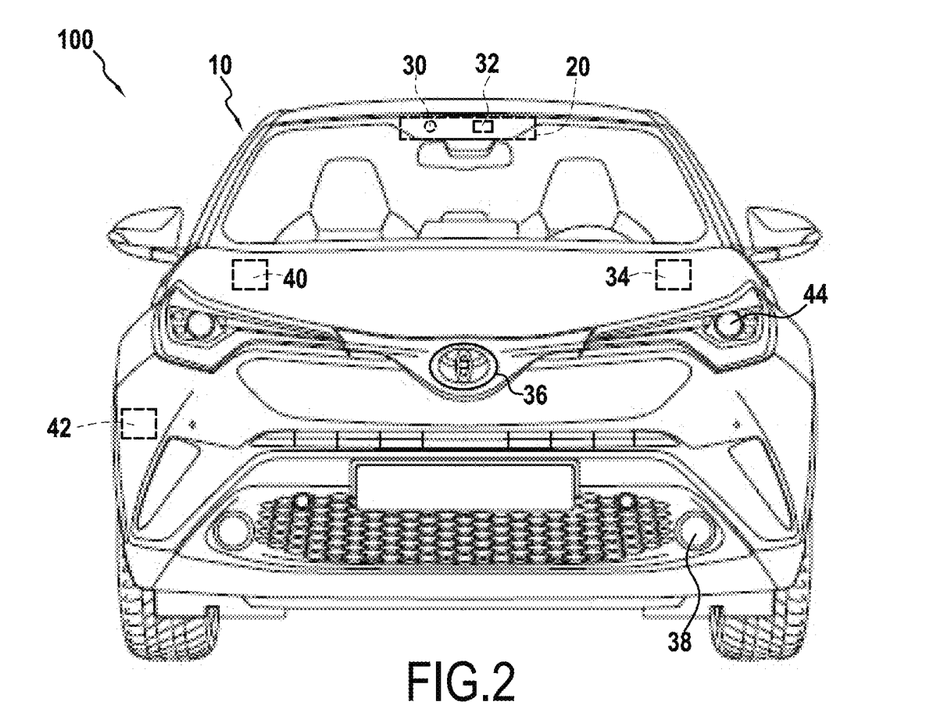
FIG. 2 is a schematic front view of a vehicle equipped with a driving assistance system in an embodiment of the invention.

FIG. 2 shows a car 100 (an example of a vehicle) in which is mounted a driving assistance system 10 which forms an exemplary embodiment of the present invention.

Figure 1:
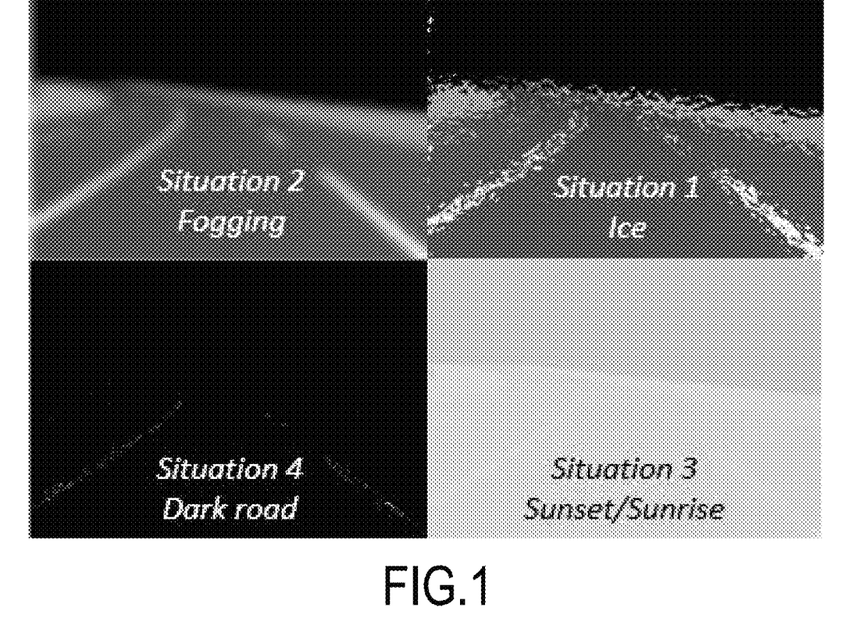
FIG. 1 is a figure showing four images acquired respectively in four distinct blockage situations of a camera.

The driving assistance system 10 (or, in short, the system 10) is, in the present case, an automated driving system comprising an electronic control unit 20 and several sensor units, namely a camera unit 30, a lidar unit 32, an outer temperature sensor unit 34, a radar unit 36, a close range sonar sensor unit 38, a GPS unit 40, a humidity sensor unit 42. The locations and shapes of these components as shown on FIG. 1 are not representative of the actual locations and shapes of the real components. Each of the sensor units can comprise one or more sensors. For instance, the camera unit 30 can comprise one or more cameras, the lidar unit 32 can comprise one or more lidars, etc.

For sake of simplicity, in the present example it will be considered that the camera unit comprises only one camera, referenced camera 30.

Although system 10 comprises all the above-mentioned sensor units, the claimed invention can be implemented with fewer sensor units, as defined in the claims.

Figure 4:
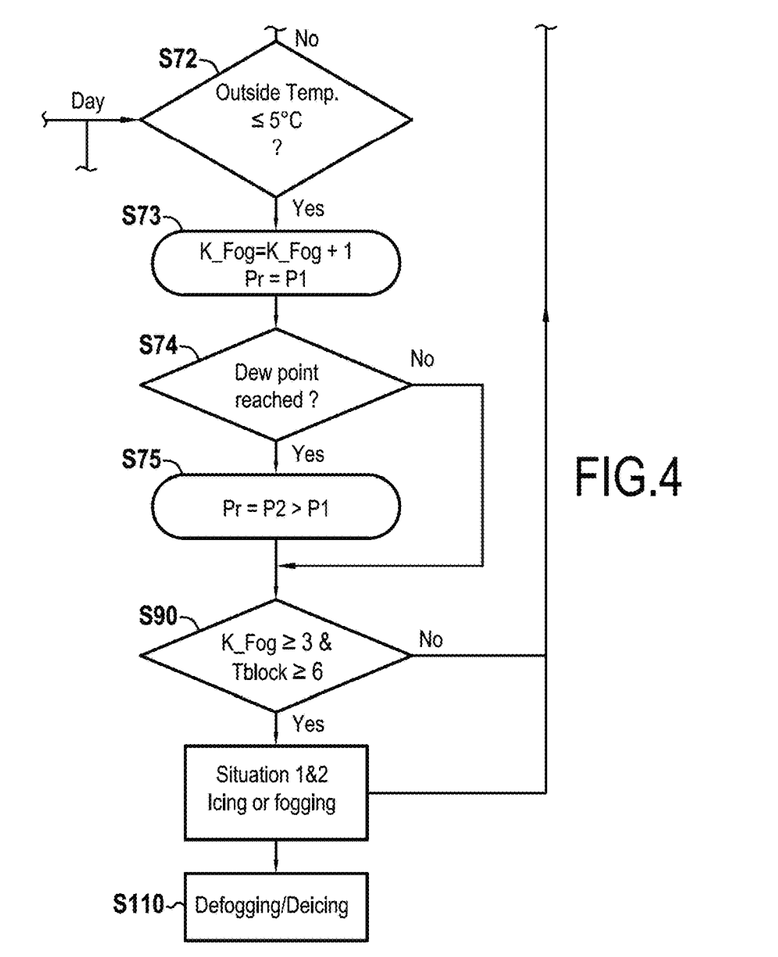
FIG. 4 is a flowchart showing the steps of a variant of the method illustrated by FIG. 3, forming a second embodiment of the present invention.
Figure 5:
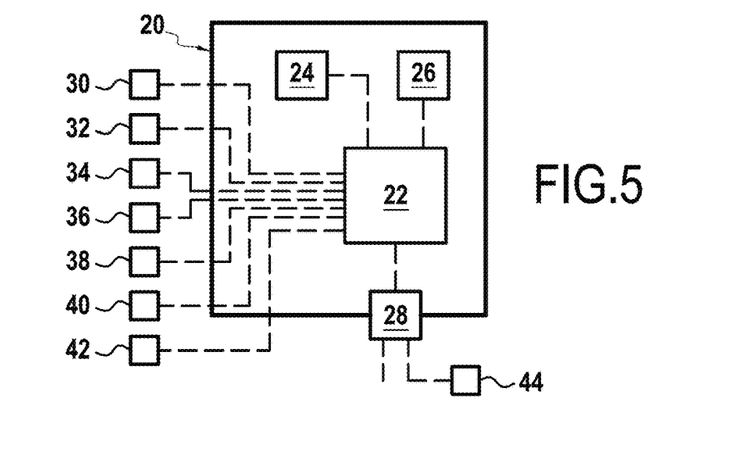
FIG. 5 is a schematic drawing showing the material architecture of the driving assistance system of FIG. 2.

The material structure of the driving assistance system 10 is illustrated by FIG. 4.

System 10 comprises an electronic control unit 20—or ECU 20—, to which all the above-mentioned sensor units (sensor units 30, 32, 34, 36, 38, 40, 42) are connected.

The ECU 20 has the hardware architecture of a computer. The ECU 20 comprises a microprocessor 22, a random access memory (RAM) 24, a read only memory (ROM) 26, an interface 28. These hardware elements are optionally shared with other units of the driving assistance system 10. The interface 28 comprises a driver interface with a (not-shown) display to transmit information to the driver of the car 100, and interface connections with actuators and other components of the car. In particular, interface 28 comprises a connection with headlights 44 of the car which makes it possible to turn the headlights on or off as desired.

A computer program to identify a cause of blockage in a sequence of images acquired by camera 30 is stored in memory 26. This program, and the memory 26, are examples respectively of a computer program and a computer-readable recording medium pursuant to the invention.

The read-only memory 26 of the ECU 20 indeed constitutes a recording medium according to the invention, readable by the processor 22 and on which said program is recorded.

First Embodiment

The program stored in memory 26 includes instructions for executing the steps of a first method for identifying a cause of blockage in a sequence of images provided by camera 30, which constitutes a first embodiment of the invention.

Figure 3:
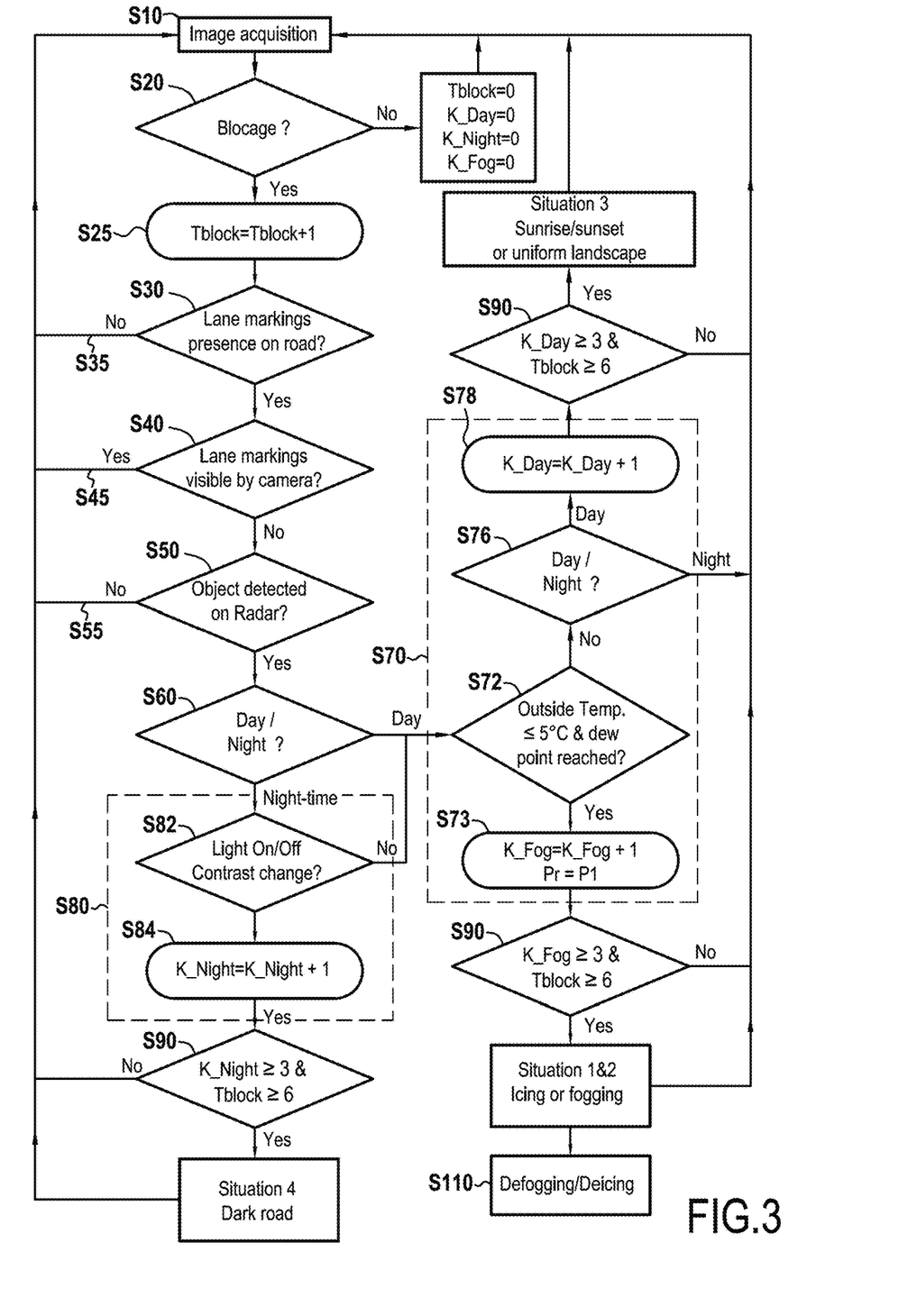
FIG. 3 is a flowchart showing the steps of a method in a first embodiment of the present invention.

This method is now going to be described in reference to FIGS. 1, 2 and 3. As it will be explained in details below, this method can either provide a presumed cause of a blockage of the camera, or can provide a more reliable indication on the cause of a blockage of the camera.

This method makes it possible to identify four different causes for a blockage of the camera, which are illustrated by FIG. 2:

(1) A situation of icing, where ice formed on the windscreen (and/or possibly even on a lens or on lenses of the camera) blurs the image and leads to detect a blockage of the camera;

(2) A situation of fogging, where fog formed on the windscreen (and/or possibly even on a lens or on lenses of the camera) blurs the image and leads to detect a blockage of the camera;

(3) A situation of sunset/sunrise, or of uniform landscape; or (4) A situation of dark road.

This method is an iterative method. The successive iterations are executed at regular intervals, for instance every 0.1 second.

At each iteration, several functions are executed, which correspond to the corresponding steps of the method. Some of the steps are conditional steps, that is, are carried out only if conditions for carrying out the step are fulfilled. In the present embodiment, all the steps of the method are performed by the ECU 20. By executing these steps, the ECU 20 identifies the cause of blockages which can happen in the images provided by the camera.

The steps of the method are shown on FIG. 3.

This method uses the following parameters:

Blockage counter 'Tblock' (integer), which counts the number of iterations during which a blockage situation has been detected.

Day-time counter 'K_Day' (integer), which counts the number of iterations during which the cause of the blockage has been determined as being presumably 'Sunset/sunrise or uniform landscape'.

Night-time counter 'K_Night' (integer), which counts the number of iterations during which the cause of the blockage has been determined as being presumably the road being dark (or 'Dark road').

Fog/Ice-time counter 'K_Fog' (integer), which counts the number of iterations during which the cause of the blockage has been determined as being presumably icing or fogging.

S10—Image Acquisition

At step S10, an image outputted by the camera 30 is acquired by ECU 20.

Since at each iteration, an image of the camera 30 is acquired, the ECU 20 successively acquires many images. These successively acquired images form a sequence of images. Each image is constituted of a matrix of pixels, for instance having 800 columns and 600 lines, in a manner known per se.

S20—Blockage Detection

At step S20, the ECU 20 detects a blockage in the sequence of images. The blockage is detected on the basis of the last images acquired by ECU 20. The blockage can be detected using any available algorithm or method for detecting such a blockage (for instance the method described by document US 2010/0182450). The number of images used is selected according to the method used for detecting the blockage.

If at step S20, a blockage is detected, the ECU 20 increments the blockage counter Tblock (step S25), and then the procedure continues at step S30.

Conversely, if at step S20, no blockage has been detected, all counters Tblock, K_Day, K_Night, K_Fog are reset to 0 (step S26), and then the procedure is resumed at step S10.

S30, S35—Lane Markings Presence Detection

At step S30, the ECU 20 determines whether a lane on which the vehicle moves has lane markings. The presence of lane markings is determined based on two items of information. The first item of information is the position of the vehicle, acquired by the GPS unit 40.

The ROM 26 further comprises a database which includes records for all the lanes of all the roads of the region in which car 100 moves.

Based on the position of the vehicle 100, the ECU 20 determines the lane on which the vehicle is moving, and then determines whether this lane (and in some cases, more precisely, this portion of the lane) has road markings such as essentially white solid or dotted lines.

Step 35 is a conditional step. If the lane on which the vehicle moves does not have lane markings, at step S35 the iteration is aborted, and the procedure is resumed at step S10.

Conversely, if the lane on which the vehicle moves has lane markings, the procedure then continues at step S40:

S40, S45—Lane Markings Detection

At step S40, the ECU 20 determines whether lane markings (at least one lane marking) can be detected in the last image of the sequence of images, that is, in the image acquired at step S10. The detection of these markings can be performed by any known image processing method.

Step 45 is a conditional step. At step 45, if at least one lane marking is detected in the last image, although a blockage has been detected at step S20, it is presumed that the camera actually works correctly. Consequently, the current iteration is then aborted, and the procedure is resumed at step S10.

Conversely, if no lane marking is detected in the last image, it seems to confirm that the camera 30 is blocked, and the procedure therefore continues at step S50.

S50, S55—Detection of an Object on the Road

At step S50, the ECU 20 determines whether there is an object on the road in front of the vehicle. The object can be any object, but will probably be in most cases a vehicle preceding car 100. It can also be a bicycle, a motorbike, etc., or any object or objects present on the road. The detection for step S50 is limited to objects (or parts of objects) which are or stand in the field of view of camera 30.

At step 50, this object or these objects are detected on the basis of environment information provided by any of the environment sensors of car 100 except camera 30, or of any combination of these sensors. Environment information is information about the environment of the vehicle. Environment sensors are sensors which can detect the presence of an object around the vehicle.

In the present case, the environment sensors of system 10 (except camera 30) are the sensors of the lidar unit 32, of the radar unit 36, and/or of the close range sonar sensor unit 38; the objects around the car 100 are detected by these environment sensors. More precisely, these objects are detected by the ECU 20, based on environment information provided by these sensors, that is, based on environment information other than environment information derived from the images acquired by camera 30.

Step 55 is a conditional step. At step 55, if it is detected that there is an object on the road in front of the vehicle, although a blockage has been detected at step S20, it is presumed that the camera actually works correctly. Consequently, the current iteration of the procedure is then aborted, and the procedure is then resumed for a new iteration at step S10.

Conversely, if no object is detected in the image, which seems to confirm that the camera 30 is blocked, the procedure then continues at step S60.

Note: Although steps 40,45 are performed before steps 50,55 in this embodiment, they could be performed in the inverse order. Or, as an alternative, only steps 40,45 could be performed, but not steps 50,55, or conversely only steps 50,55 but not steps 40,45. The invention could also be implemented without performing any of steps 40,45,50,55, but at the cost of a reduced reliability of the method.

S60—Daytime Determination

At step S60, the ECU 20 determines whether it is daytime or night-time (at the time of acquisition of the last image of the sequence of images. In most cases, the method is executed in real time and the time of acquisition of the last image of the sequence of images is simply the current time for the vehicle).

To determine whether it is day-time or night-time, the ECU 20 uses time information of the driving assistance system. The determination of whether it is night-time or day-time can be improved by taking into account the date and/or the position of the vehicle (provided by the GPS unit 40), which influence the exact time of dawn and dusk.

In the ECU determines at step S60 that it is day-time, the procedure then continues at step S70; otherwise, the ECU 20 determines that it is night-time, and after step S60 the procedure continues at step S80.

S70—Presumed Blockage Cause Determination During Daytime

Step 70 is a conditional step. At step 70, the ECU 20 first performs steps S72 of determining whether the outside temperature is below a low temperature threshold, and whether the dew point is reached (that is, whether the air is saturated in water vapour, whereby any additional vapour would condense). The outside temperature is measured by outer temperature sensor unit 34, which measures the temperature outside the vehicle. The humidity content of the atmosphere is measured by humidity sensor unit 42. Based on the outer temperature and the humidity content of the atmosphere, the ECU 20 first determines whether the dew point of water is reached. If the dew point of water is reached, it can be presumed that fogging has occurred on one of the transparent walls through which the camera 30 sees. The ECU 20 also determines whether the outer temperature is negative or at least close to 0° C. It the outer temperature is negative or close to 0° C., it can be presumed that icing has occurred on the windscreen or on a lens of camera 30, which causes a blockage to be detected.

In the present embodiment, if ECU 20 determines that the outside temperature is below or equal to 5° C. and the dew point is reached, at a step S73 ECU 20 determines that for the current iteration, the cause of the blockage is presumably icing or fogging (situation 1 or 2 on FIG. 1), and increments counter K_Fog. The procedure then continues at step 90.

Conversely, if at step S72 it is determined that the outside temperature is above the low temperature threshold (5° C.) or that the dew point of water is not reached, the procedure continues at step S76.

At step S76, ECU 20 determines whether it is day-time or night-time.

If ECU 20 determines that it is night-time, no conclusion is reached with respect to the cause of the blockage detection; the current iteration is aborted, and the procedure is resumed with a new iteration at step S10.

If conversely, ECU 20 determines that it is day-time, the procedure continues at step S78.

At step S78, ECU 20 determines that for the current iteration, the cause of the blockage is presumably a sunset/sunrise situation or a uniform landscape situation (situation 3 on FIG. 1), and increments counter K_Day. The procedure then continues at step 90.

S80—Presumed Blockage Cause Determination During Night-Time

Step S80 is executed only when if it has been determined that it is night-time, and accordingly when the headlights are on.

At step S80, the ECU 20 first determines in a step S82 whether toggling front light(s) of the vehicle on/off causes contrast change in the images.

Step 82 is carried out as follows.

The ECU 20 sends controls to turn the headlights 44 off during a very short period, and then to turn them on again.

During the period when the headlights are off, ECU 20 controls the camera 30 to acquire at least one image. The 'OFF' images acquired by camera 30 during this period are transmitted to ECU 20.

ECU 20 then controls camera 30 to acquire a few images after the headlights 44 have been turned On. The 'ON' images acquired by camera 30 during this latter period are also transmitted to ECU 20.

By comparing the OFF images to the ON images, the ECU 20 then determines at a step S82, whether toggling the headlights (as an example of front light(s) of the vehicle) between on/off positions causes a change in the images.

If at step S82, it is determined that toggling front light(s) on/off causes contrast change in the images, at step S84 the ECU 20 determines that for the current iteration, the cause of the blockage is presumably the road being dark, and increments counter K_Night. After step 84, the procedure then continues at step S90.

Conversely, if it is not determined at step S82, that toggling the headlights between on/off positions causes a change in the images, the cause of the blockage is not presumed to be the road being dark. Consequently, the procedure continues to step S70, in order to determine whether the cause of blockage could be icing/fogging (situations 1 or 2 on FIG. 1).

S90—Confirmation of Blockage Cause

The confirmation step 90 is executed each time it has been possible to identify a presumed cause of the blockage.

In step 90, the ECU 20 tries to determine whether the cause of the blockage can now be considered as confirmed.

In this purpose, the ECU 20 checks the values of the different counters.

The ECU 20 first assesses whether a blockage has been detected successively during a sufficient number of iterations, for instance, during a minimum number of 6 iterations. ECU 20 accordingly checks whether Tblock is at least equal to 6.

If this first requirement is satisfied, the ECU 20 then assesses whether the last-detected cause of blockage has been detected a sufficient number of times since situations of blockage have been detected. In the present embodiment, ECU 20 assesses whether the last-detected cause of blockage has been detected at least 3 times, and therefore checks whether one of the counters K_Fog, K_Day, or K_Night is at least equal to 3. The counter which is checked is the counter which corresponds to the last cause of blockage that has been detected. The counters K_Fog, K_Day, or K_Night correspond respectively to three different causes of blockage: icing/fogging (situations 1 or 2), sunrise/sunset or uniform landscape (situation 3), or Dark road (situation 4).

Let us suppose for instance that the ECU 20 has just identified at step S74 that the presumed cause of blockage is icing or fogging.

Accordingly at step S90, ECU checks if counter TBlock is at least equal to 6; if is it the case, ECU 20 then determines if the counter D_Fog is at least equal to 3.

If this is also the case, ECU 20 determines that the cause of the blockage is icing or fogging.

(Different values can be set for the threshold N2 for the various counters if it is judged that a specific cause of blockage require to be detected a smaller or larger number of times before being sufficiently confirmed). If one of these counters fulfills this condition and is at least equal to 3, the ECU determines that the cause of the blockage is of the type associated with that counter.

If the ECU 20 confirms that the cause of the blockage is icing or fogging, at step S110 the ECU automatically turns on the air-conditioning system of the car.

In another embodiment, the car is equipped with a heater for heating the atmosphere between the camera and the windscreen. In this embodiment, if the ECU 20 confirms that the cause of the blockage is icing or fogging, at step S110 the ECU automatically turns on said heater in order to heat the atmosphere between the camera and the windscreen in order to deice and/or defog the windscreen at this location.

Second Embodiment

A second method for identifying a cause of blockage in a sequence of images provided by camera 30, which constitutes a second embodiment of the invention, is now going to be described in reference to FIG. 4.

This second method is identical to the first method except for step S70. Indeed in step S70, rather than carrying out in step S72 a double test (outside temperature and dew point) in a single step S72, these two tests are made successively.

Accordingly, step S70 is carried out as follows:

At step 72, the ECU 20 determines whether the outside temperature is below a low temperature threshold of 5° C. (but does not determine whether the dew point is reached), based on the outside temperature measured by outer temperature sensor unit 34.

At step S73, if the outer temperature is determined to be below or equal to 5° C., it is presumed that icing or fogging has occurred on the windscreen or on a lens of camera 30, which causes a blockage to be detected (situation 1 or 2 on FIG. 1). ECU 20 sets the probability Pr of the blockage to be caused by icing or fogging to a first value P1, and increments the value of the counter K_Fog.

Then, at step S74, ECU 20 determines whether the dew point of water is reached, based on the humidity content of the atmosphere measured by humidity sensor unit 42.

At step S75, if the dew point of water is reached, it is confirmed that fogging has occurred on one of the transparent walls through which the camera 30 sees. Consequently, ECU 20 increases the value Pr of the probability that the blockage is being caused by icing or fogging, and sets this probability Pr to a value P2 higher than P1.

After step S75, the procedure continues at step 90.

In this case, when after step 90 the cause of the blockage is considered as confirmed, different actions can be taken depending on the probability Pr that the cause of the blockage is icing or fogging.

As in the first method, if at step S72, it is determined that the outside temperature is above 5° C., the procedure continues at step S76, in which the ECU 20 determines that for the current iteration, the cause of the blockage is presumably a sunset/sunrise situation or a uniform landscape situation (situation 3 on FIG. 1).

The various counters (Tbloc, K_Fog, K_Day, K_Night) are used as in the first method.

The invention claimed is:

1. A method for identifying a cause of blockage in a sequence of images provided by a camera mounted in a vehicle which is moving on a road, the method comprising iteratively performing steps of:
   acquiring an image from the camera, successively acquired images thus forming said sequence of images;
   detecting a blockage in last images of the sequence of images;
   determining whether it is day-time or night-time based at least on time information;
   based on determining that it is night-time, performing further steps comprising:
      turning off front lights of the vehicle for a first time duration;
      acquiring, during the first time duration, at least one first image from the camera;
      turning on the front lights of the vehicle for a second time duration; the second time duration immediately following the first time duration;
      acquiring, during the second time duration, at least one second image from the camera;
      comparing the at least one first image with the at least one second image to determine whether toggling the front lights of the vehicle causes a contrast change between the at least one first image and the at least one second image; and
      based on determining that the toggling of the front lights causes the contrast change between the at least one first image and the at least one second image, determining, that for a current iteration, the cause of the blockage is that the road is dark; and
   based on determining that it is day-time, performing further steps comprising:
      determining whether a dew point is reached;
      when it is determined that the dew point is not reached, determining that for the current iteration, the cause of the blockage is icing or fogging with a first probability; and
      when it is determined that the dew point is reached, determining that for the current iteration, the cause of the blockage is icing or fogging with a second probability which is higher than the first probability.

2. A method for identifying a cause of blockage according to claim 1, wherein when it is determined that it is day-time, the method further comprises:
   determining whether an outside temperature is below a low temperature threshold; and
   when it is determined that the outside temperature is below the low temperature threshold, determining that for the current iteration, the cause of the blockage is icing or fogging.

3. A method for identifying a cause of blockage according to claim 2, wherein the method further comprises:
   when it is determined that the outside temperature is above the low temperature threshold or a dew point is not reached, determining that for the current iteration, the cause of the blockage is a sunset/sunrise situation or a uniform landscape situation.

4. A method for identifying a cause of blockage according to claim 1, wherein the method further comprises, during an iteration, before determining whether it is day-time or night-time based at least on the time information, performing steps of:
- detecting lane markings in a last image of the sequence of images; and
- when lane markings are detected in the last image, returning to the step of image acquisition.

5. A method for identifying a cause of blockage according to claim 4, wherein the method further comprises, during the iteration, before the detecting of the lane markings in the last image of the sequence of images, performing steps of:
- determining whether a lane on which the vehicle moves has the lane markings, based on position information of the vehicle and a database comprising records of lanes having the lane markings; and
- when the lane on which the vehicle moves does not have the lane markings, returning to the step of the image acquisition.

6. A method for identifying a cause of blockage according to claim 1, wherein the method further comprises, during an iteration, before determining whether it is day-time or night-time based at least on the time information, performing steps of:
- detecting whether there is an object on the road in front of the vehicle, based on information other than information derived from the images; and
- when no object is detected on the road in front of the vehicle, returning to the step of image acquisition.

7. A method for identifying a cause of blockage according to claim 1, wherein the method further comprises, when, during an iteration, a first cause of blockage has been detected, performing:
- assessing of whether a blockage has been detected at least for each of last N1 iterations, and assessing whether the cause of the blockage has been determined to be said first cause for at least N2 iterations during the last N1 iterations, N1 and N2 being predetermined numbers; and
- when a blockage has been detected at least for each of last N1 iterations, and the cause of the blockage has been determined to be said first cause for at least N2 iterations during the last N1 iterations, triggering an action based on the determination that the cause of the blockage is said first cause.

8. A method for identifying a cause of blockage according to claim 1, wherein the images are partial images which are part of larger images acquired by the camera.

9. A computer program which is stored on a non-transitory computer readable storage media, and which is suitable for being performed on a computer, the computer program including instructions adapted to perform the steps of a method according to claim 1 when it is run on the computer.

10. A non-transitory computer-readable recording medium including instructions of a computer program according to claim 9.

11. A driving assistance system, comprising an electronic control unit, a camera, an outer temperature sensor, the electronic control unit, the camera and the outer temperature sensor being configured to be mounted in a vehicle; wherein the electronic control unit is configured to iteratively:
- acquire an image from the camera, successively acquired images thus forming a sequence of images;
- detect a blockage situation in last images of the sequence of images;
- determine whether it is day-time or night-time based at least on time information; and,
- based on, during a current iteration, the electronic control unit having determined that it is night-time:
  - turn off front lights of the vehicle for a first time duration;
  - acquire, during the first time duration, at least one first image from the camera;
  - turn on the front lights of the vehicle for a second time duration; the second time duration immediately following the first time duration;
  - acquire, during the second time duration, at least one second image from the camera;
  - compare the at least one first image with the at least one second image to determine whether toggling the front lights of the vehicle causes a contrast change between the at least one first image and the at least one second image; and
  - based on the electronic control unit having determined that the toggling of the front lights causes the contrast change between the at least one first image and the at least one second image, determine, that for the current iteration, the cause of the blockage is that the road is dark; and
- based on, during the current iteration, the electronic control unit having determined that it is day-time:
  - determine whether a dew point is reached;
  - when it is determined that the dew point is not reached, determine that for the current iteration, the cause of the blockage is icing or fogging with a first probability; and
  - when it is determined that the dew point is reached, determine that for the current iteration, the cause of the blockage is icing or fogging with a second probability which is higher than the first probability.

12. A driving assistance system according to claim 11, wherein the electronic control unit is further configured to, when, during an iteration, the electronic control unit has determined that it is day-time:
- determine whether an outside temperature is below a low temperature threshold, based on information provided by the outer temperature sensor; and
- when the electronic control unit has determined that the outside temperature is below the low temperature threshold, determine that for the current iteration, the cause of the blockage is icing or fogging.

13. A driving assistance system according to claim 12, wherein the electronic control unit is further configured to:
- when the electronic control unit has determined that the outside temperature is above the low temperature threshold or dew point is not reached, determine that for the current iteration, the cause of the blockage is a sunset/sunrise situation or a uniform landscape situation.

14. A driving assistance system according to claim 11, wherein the electronic control unit is further configured to, during an iteration, before determining whether it is day-time or night-time:
- detect lane markings in a last image of the sequence of images; and
- when at least one lane marking is detected in the last image, to return to image acquisition.

15. A driving assistance system according to claim 11, wherein the electronic control unit is further configured to, during an iteration, before determining whether it is day-time or night-time:

detect whether there is an object on the road in front of the vehicle, using environment information other than information derived from the images; and when the electronic control unit has detected that there is an object on the road in front of the vehicle, to return to image acquisition.

16. A driving assistance system according to claim 11, wherein the electronic control unit is further configured to, when, during an iteration, a first cause of blockage has been detected:

assess whether a blockage has been detected at least for each of last N1 iterations, and to assess whether the cause of the blockage has been determined to be said first cause for at least N2 iterations during the last N1 iterations, N1 and N2 being predetermined numbers and when a blockage has been detected at least for each of last N1 iterations, and the cause of the blockage has been determined to be the first cause for at least N2 iterations during the last N1 iterations, to trigger an action based on the determination that the cause of the blockage is said first cause.

17. A method for identifying a cause of blockage in a sequence of images provided by a camera mounted in a vehicle which is moving on a road, the method comprising iteratively performing steps of:

acquiring an image from the camera, successively acquired images thus forming said sequence of images;

detecting a blockage in last images of the sequence of images;

calculating a dusk time based at least one time information and position information of the vehicle;

determining whether it is day-time or night-time based on the dusk time;

determining whether front lights of the vehicle are turned on;

based on determining that it is night-time and that the front lights of the vehicle are turned on, performing further steps comprising:

turning off front lights of the vehicle for a first time duration;

acquiring, during the first time duration, at least one first image from the camera;

turning on the front lights of the vehicle for a second time duration; the second time duration immediately following the first time duration;

acquiring, during the second time duration, at least one second image from the camera;

comparing the at least one first image with the at least one second image to determine whether toggling the front lights of the vehicle causes a contrast change between the at least one first image and the at least one second image; and based on determining that the toggling of the front lights causes the contrast change between the at least one first image and the at least one second image, determining, that for a current iteration, the cause of the blockage is that the road is dark; and based on determining that it is day-time, performing further steps comprising:

determining whether a dew point is reached;

when it is determined that the dew point is not reached, determining that for the current iteration, the cause of the blockage is icing or fogging with a first probability; and when it is determined that the dew point is reached, determining that for the current iteration, the cause of the blockage is icing or fogging with a second probability which is higher than the first probability.

18. A method for identifying a cause of blockage according to claim 17, wherein the method further comprises, when, during an iteration, a first cause of blockage has been detected, performing:

assessing of whether a blockage has been detected at least for each of last N1 iterations, and assessing whether the cause of the blockage has been determined to be said first cause for at least N2 iterations during the last N1 iterations, N1 and N2 being predetermined numbers; and when a blockage has been detected at least for each of last N1 iterations, and the cause of the blockage has been determined to be said first cause for at least N2 iterations during the last N1 iterations, triggering an action based on the determination that the cause of the blockage is said first cause.

19. A method for identifying a cause of blockage in a sequence of images provided by a camera mounted in a vehicle which is moving on a road, the method comprising iteratively performing steps of:

acquiring an image from the camera, successively acquired images thus forming said sequence of images;

detecting a blockage in last images of the sequence of images;

determining whether it is day-time or night-time based at least on time information;

based on determining that it is night-time, performing further steps comprising:

turning off front lights of the vehicle for a first time duration;

acquiring, during the first time duration, at least one first image from the camera;

turning on the front lights of the vehicle for a second time duration; the second time duration immediately following the first time duration;

acquiring, during the second time duration, at least one second image from the camera;

comparing the at least one first image with the at least one second image to determine whether toggling the front lights of the vehicle causes a contrast change between the at least one first image and the at least one second image;

based on determining that the toggling of the front lights causes the contrast change between the at least one first image and the at least one second image, determining, that for a current iteration, the cause of the blockage is that the road is dark; and based on determining that it is day-time, performing further steps comprising:

determining whether an outside temperature is below a low temperature threshold;

when it is determined that the outside temperature is below the low temperature threshold, determining that for the current iteration, the cause of the blockage is icing or fogging; and when it is determined that the outside temperature is above the low temperature threshold or a dew point is not reached, determining that for the current iteration, the cause of the blockage is a sunset/sunrise situation or a uniform landscape situation.

* * * * *